United States Patent
Ishii

(10) Patent No.: US 10,622,916 B1
(45) Date of Patent: Apr. 14, 2020

(54) POWER CONVERSION DEVICE AND DIRECT-CURRENT POWER TRANSMISSION SYSTEM

(71) Applicant: MITSUBISHI ELECTRIC CORPORATION, Chiyoda-ku (JP)

(72) Inventor: Yuki Ishii, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/474,265

(22) PCT Filed: Oct. 27, 2017

(86) PCT No.: PCT/JP2017/038906
§ 371 (c)(1),
(2) Date: Jun. 27, 2019

(87) PCT Pub. No.: WO2018/131260
PCT Pub. Date: Jul. 19, 2018

(30) Foreign Application Priority Data

Jan. 13, 2017 (JP) .................. 2017-004374

(51) Int. Cl.
*H02M 7/797* (2006.01)
*H02M 7/5395* (2006.01)
*H02M 7/497* (2007.01)

(52) U.S. Cl.
CPC ......... *H02M 7/5395* (2013.01); *H02M 7/497* (2013.01); *H02M 7/797* (2013.01)

(58) Field of Classification Search
CPC ...... H02M 7/483; H02M 7/493; H02M 7/497; H02M 7/5387; H02M 7/539; H02M 7/5395; H02M 7/79; H02M 7/797
See application file for complete search history.

(56) References Cited

U.S. PATENT DOCUMENTS

| | | | |
|---|---|---|---|
| 8,848,401 B2* | 9/2014 | Green | H02M 7/49 363/35 |
| 9,130,458 B2* | 9/2015 | Crookes | H02J 3/1835 |

(Continued)

FOREIGN PATENT DOCUMENTS

| | | |
|---|---|---|
| EP | 3 001 552 A1 | 3/2016 |
| JP | 2011-109749 A | 6/2011 |

OTHER PUBLICATIONS

International Search Report dated Nov. 21, 2017, in PCT/JP2017/038906 filed on Oct. 27, 2017.

(Continued)

*Primary Examiner* — Matthew V Nguyen
(74) *Attorney, Agent, or Firm* — Oblon, McClelland, Maier & Neustadt, L.L.P.

(57) ABSTRACT

A power conversion device includes a plurality of converter cells 1, and the converter cell 1 includes: an upper arm 13*u*, which includes a semiconductor switching element 11*u* configured to allow conduction in only one direction and a diode 12*u* connected in anti-parallel to the semiconductor switching element 11*u*; and a lower arm 13*b*, which is connected to the upper arm 13*u*, and includes a semiconductor switching element 11*b* configured to allow reverse conduction and a diode 12*b* connected in anti-parallel to the semiconductor switching element 11*b*, in which the semiconductor switching element 11*b* and the diode 12*b* of the lower arm 13*b* are simultaneously set to conductive states to split an electric current to flow through the diode 12*b* to the semiconductor switching element 11*b*.

13 Claims, 9 Drawing Sheets

(56) References Cited

U.S. PATENT DOCUMENTS

| | | |
|---|---|---|
| 2015/0061408 A1 | 3/2015 | Janning |
| 2015/0280604 A1* | 10/2015 | Hassanpoor ............ H02M 7/06 |
| | | 363/126 |
| 2018/0109200 A1* | 4/2018 | Kuroda ................... H02M 7/23 |
| 2019/0131867 A1* | 5/2019 | Ishii ........................ H02M 7/48 |

OTHER PUBLICATIONS

Hagiwara, M. et al., "PWM Control and Experiment of Modular Multilevel Converters", The Transactions of the Institute of Electrical Engineers of Japan, vol. 128, No. 7, 2008, pp. 957-965 (with partial translation).

* cited by examiner

1A

Z

POWER CONVERSION DEVICE AND DIRECT-CURRENT POWER TRANSMISSION SYSTEM

TECHNICAL FIELD

The present invention relates to a power conversion device and a direct-current power transmission system, and more particularly, to a power conversion device including a plurality of converter cells and a direct-current power transmission system using the power conversion device.

BACKGROUND ART

In recent years, as power conversion devices for use in high-voltage applications, such as power systems, multilevel converters are put into practical use. The multilevel converters are power converters in which a plurality of converter cells are connected in series to one another, and in which the series connections are further connected in multiple. Those converters are called a modular multilevel converter (MMC), a cascaded multilevel converter (CMC), or the like.

Moreover, it is known that, in the multilevel converters, the converter cells are formed with the use of semiconductor switching elements, such as insulated-gate bipolar transistors (IGBTs) (see Non Patent Literature 1, for example).

CITATION LIST

Non-Patent Literature

[NPTL 1] Hagiwara Makoto and Akagi Hirofumi, "PWM Control and Experiment of Modular Multilevel Converters (MMC)", The transactions of the Institute of Electrical Engineers of Japan. D, Vol. 128, No. 7, pp. 957-965, 2008 (p. 958, FIG. 1)

SUMMARY OF INVENTION

Technical Problem

When the power conversion devices perform an operation as a rectifier configured to transmit electric power from an AC system to a DC system, electric currents to flow through diodes in the converter cells become large, and hence a large loss is caused in the diodes. As a result, the large loss leads to upsizing of a radiator configured to cool the converter cell in some cases.

The present invention has been made to solve the above-mentioned problem, and therefore has an object to provide a power conversion device and a direct-current power transmission system, which suppress a loss caused in a diode in a converter cell to allow downsizing of a radiator.

Solution to Problem

According to one embodiment of the present invention, there is provided a direct-current power transmission system configured to interconnect an AC system and a DC system to transmit electric power from the AC system to the DC system, the direct-current power transmission system including: AC terminals to be connected to the AC system; DC terminals to be connected to the DC system; and a plurality of converter cells connected between the AC terminals and the DC terminals, at least one of the plurality of converter cells including: a first arm, which includes a first semiconductor switching element and a first diode connected in anti-parallel to the first semiconductor switching element; and a second arm, which is connected in series to the first arm, and includes a second semiconductor switching element and a second diode connected in anti-parallel to the second semiconductor switching element, the first semiconductor switching element including a semiconductor switching element configured to allow conduction in only one direction, the second semiconductor switching element including a semiconductor switching element configured to allow reverse conduction, the second semiconductor switching element and the second diode being set to a conductive state simultaneously.

Advantageous Effects of Invention

According to one embodiment of the present invention, in the arm on the side in which the large electric current flows through the diode, the semiconductor switching element and the diode are simultaneously set to the conductive states. As a result, an arm current is split to flow through the semiconductor switching element and the diode, to thereby significantly reduce a conduction loss caused in the diode, and allow downsizing of the radiator of the converter cell.

DESCRIPTION OF EMBODIMENTS

Now, a power conversion device according to each of embodiments of the present invention is described with reference to the drawings.

First Embodiment

In a first embodiment of the present invention, as a power conversion device according to an embodiment of the present invention, a power conversion device configured to interconnect a three-phase power system and a DC power system is described as an example. An operation in a steady state, that is, an operation during normal operation of the power conversion device according to the first embodiment is a rectifier operation of transmitting electric power from the three-phase power system to the DC power system. Therefore, it is desired that the power conversion device according to the first embodiment be mounted not at an inverter end but at a rectifier end in a direct-current power transmission system configured to transmit electric power from the three-phase power system to the DC power system.

Figure 1:
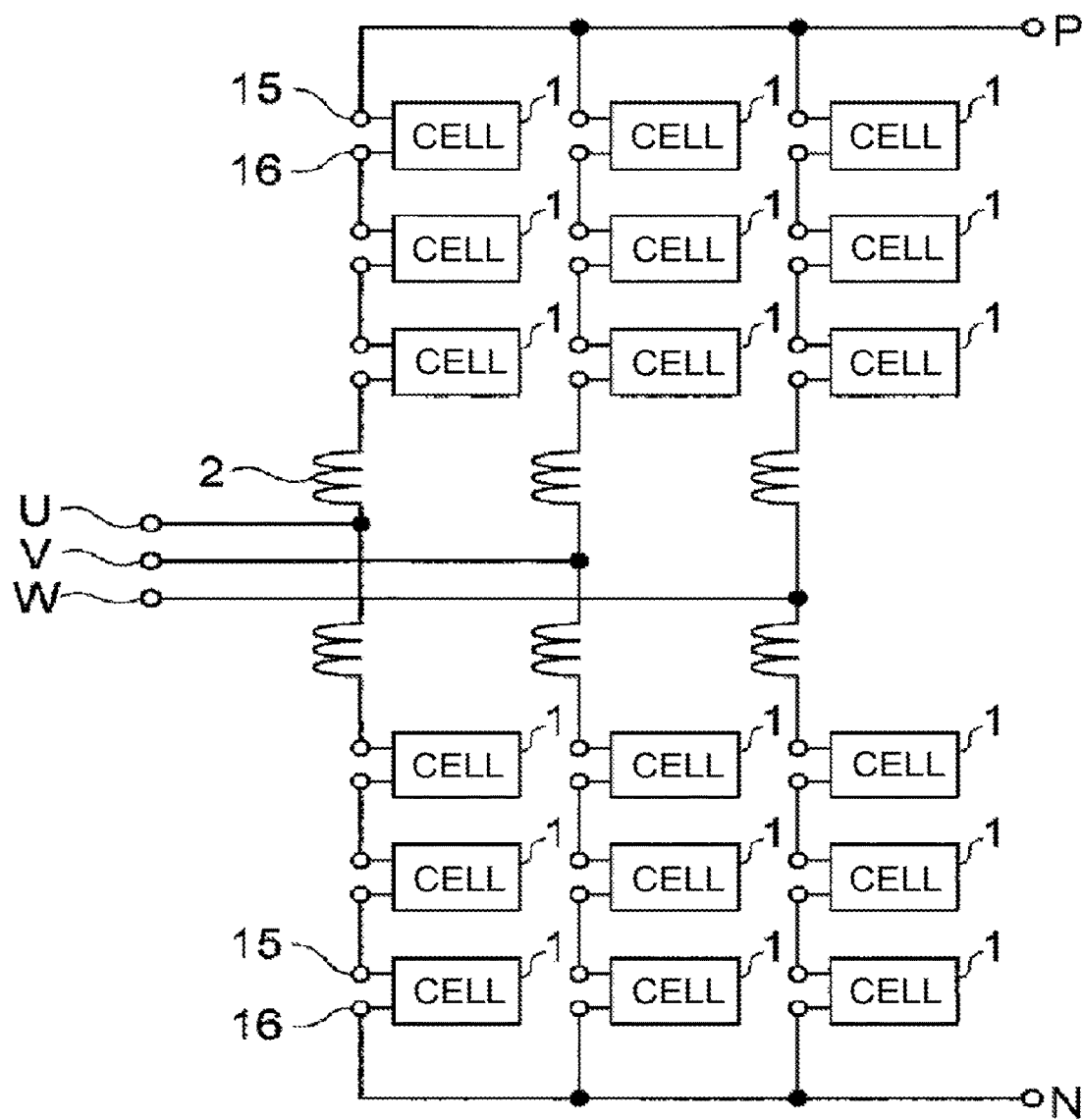
FIG. 1 is a configuration diagram for illustrating a configuration of a power conversion device according to a first embodiment of the present invention.

FIG. 1 is a configuration diagram for illustrating a configuration of a power conversion device according to the first embodiment. The configuration of the power conversion device according to the first embodiment is described with reference to FIG. 1.

As illustrated in FIG. 1, the power conversion device according to the first embodiment includes three AC terminals U, V, and W and two DC terminals P and N. Between the AC terminals U, V, and W and the DC terminals P and N, a plurality of phase arms including a plurality of converter cells 1 are disposed.

Each phase arm is formed by connecting a plurality of converter cells 1 in series to one another. In the first embodiment, each phase arm is formed by connecting three converter cells 1 in series to one another, but the present invention is not limited thereto. The number of converter cells 1 included in each phase arm may be any number, and may be suitably determined.

In FIG. 1, six phase arms are disposed. Specifically, one phase arm is connected between the DC terminal P and each of the AC terminals U, V, and W, and similarly, one phase arm is connected between the DC terminal N and each of the AC terminals U, V, and W.

The power conversion device according to the first embodiment is interconnected to the three-phase power system, and hence an example in which the AC terminals include three terminals U, V, and W is illustrated. However, there may be equally adopted a configuration in which the AC terminals include two terminals when the power conversion device is interconnected to a single-phase power system, or a configuration in which the AC terminals include four or more terminals when the power conversion device is interconnected to a multi-phase power system.

Moreover, a reactor 2 is connected between each of the AC terminals U, V, and W and each of the DC terminals P and N.

In the first embodiment, an example in which the reactor 2 is connected between each of the AC terminals U, V, and W and each of the phase arms is described. However, the present invention is not limited thereto. For example, the reactor 2 may be connected between each of the DC terminals P and N and each of the phase arms. Moreover, there may be adopted a configuration in which the reactor 2 is disposed only between each of the AC terminals U, V, and W and the DC terminal P, and there may also be adopted a configuration in which the reactor 2 is disposed only between each of the AC terminals U, V, and W and the DC terminal N. Moreover, it is not always required that the reactor 2 have a coil shape, and the reactor 2 may be formed of a cable having an intentionally long wiring length, for example.

Figure 2:
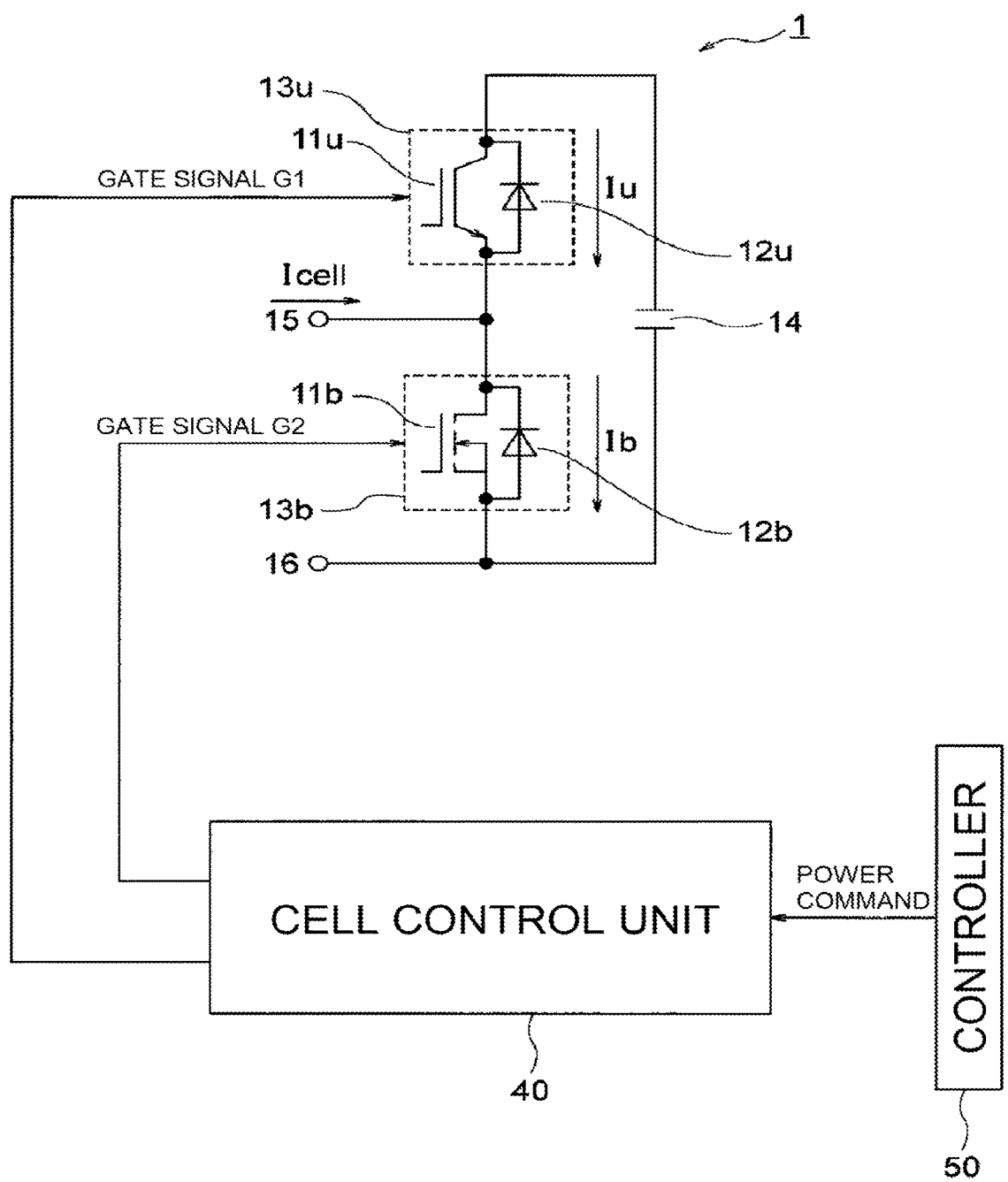
FIG. 2 is a circuit diagram for illustrating a configuration of a converter cell in the power conversion device according to the first embodiment of the present invention.

FIG. 2 is a configuration diagram for illustrating a configuration of the converter cell 1. The configuration of the converter cell 1 is described with reference to FIG. 2.

Each converter cell 1 includes a configuration of a chopper circuit. As illustrated in FIG. 2, each converter cell 1 is formed of an upper arm 13$u$, a lower arm 13$b$, an energy storage device 14, an output terminal 15, and an output terminal 16.

The upper arm 13$u$ includes a semiconductor switching element 11$u$ configured to allow conduction in only one direction, and a diode 12$u$ connected in anti-parallel to the semiconductor switching element 11$u$. As the semiconductor switching element 11$u$, an IGBT, a gate commutated turn-off thyristor (GCT), or other semiconductor elements is used, for example.

Meanwhile, the lower arm 13$b$ includes a semiconductor switching element 11$b$ configured to allow reverse conduction, and a diode 12$b$ connected in anti-parallel to the semiconductor switching element 11$b$. As the semiconductor switching element 11$b$, a MOSFET, a reverse-conducting IGBT, a reverse-conducting thyristor, or other semiconductor elements configured to allow reverse conduction is used, for example.

The upper arm 13$u$ and the lower arm 13$b$ are connected in series to each other to form a leg. The energy storage device 14 is connected in parallel to the leg. The energy storage device includes a capacitor, for example. As the capacitor, an electrolytic capacitor, a film capacitor, or the like may be used, and a capacitor of another type may be used. As described above, each converter cell 1 includes at least one leg.

To a node at which one end of the upper arm 13$u$ and one end of the lower arm 13$b$ are connected in series to each other, the output terminal 15 is connected. The node is hereinafter referred to as a midpoint between the upper arm 13$u$ and the lower arm 13$b$. Moreover, the other end of the upper arm 13$u$ is connected to one end of the energy storage device 14 described above. Further, the other end of the lower arm 13$b$ is connected to the other end of the energy storage device 14, and to the output terminal 16.

In the first embodiment, the output terminals 15 and 16 are connected to both ends of the lower arm 13$b$, but the present invention is not limited to that case. The output terminals 15 and 16 may be connected to both ends of the upper arm 13$u$ to form a chopper circuit. In that case, the upper arm 13$u$ includes a semiconductor switching element 11$u$ configured to allow reverse conduction, and a diode 12$u$ connected in anti-parallel to the semiconductor switching element 11$u$, and the lower arm 13$b$ includes a semiconductor switching element 11$b$ configured to allow conduction in only one direction, and a diode 12$b$ connected in anti-parallel to the semiconductor switching element 11$b$.

Moreover, in the first embodiment, the diode 12$u$ and the diode 12$b$ are disposed in the converter cell 1, but it is not always required that the diode 12$u$ and the diode 12$b$ be disposed in the converter cell 1. For example, when the semiconductor switching element 11$u$ includes an element including a diode, the diode 12$u$ may be omitted. Similarly, when the semiconductor switching element 11$b$ includes an element including a diode, the diode 12$b$ may be omitted.

Further, in the first embodiment, there is illustrated an example in which one semiconductor switching element 11$u$ and one diode 12$u$ are used in the upper arm 13$u$. Similarly, there is illustrated an example in which one semiconductor switching element 11$b$ and one diode 12$b$ are used in the lower arm 13$b$. This configuration is hereinafter referred to as a "one-series one-parallel" configuration. The first embodiment is not limited to the case of the one-series one-parallel configuration, and for the purpose of increasing a capacity of the power conversion device, each of the upper arm 13u and the lower arm 13b may adopt a multiple-series multiple-parallel configuration. In other words, in each of the upper arm 13u and the lower arm 13b, a plurality of semiconductor switching elements may be connected in series to one another, and a plurality of diodes may also be used.

Subsequently, switching operation of the converter cell 1 is described. As illustrated in FIG. 2, gate signals G1 and G2 are input from a cell control unit 40 to each converter cell 1. A gate signal input to the upper arm 13u is referred to as the "gate signal G1", and a gate signal input to the lower arm 13b is referred to as the "gate signal G2".

Figure 3:
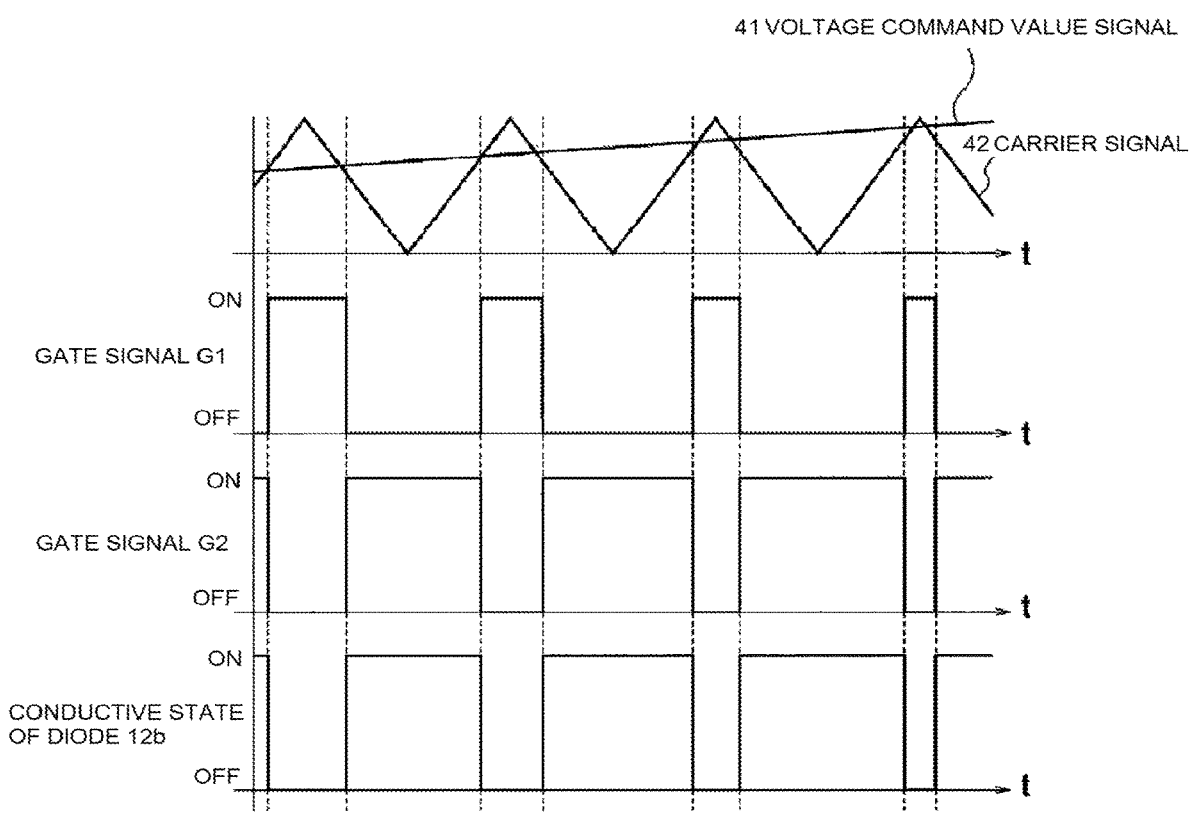
FIG. 3 is a chart for showing gate signals of the converter cell in the power conversion device according to the first embodiment of the present invention.

In FIG. 3, the gate signals G1 and G2 are shown. In FIG. 3, a voltage command value signal 41, a carrier signal 42, and a conductive state of the diode 12b are additionally shown. Horizontal axes of FIG. 3 all indicate time.

Figure 4:
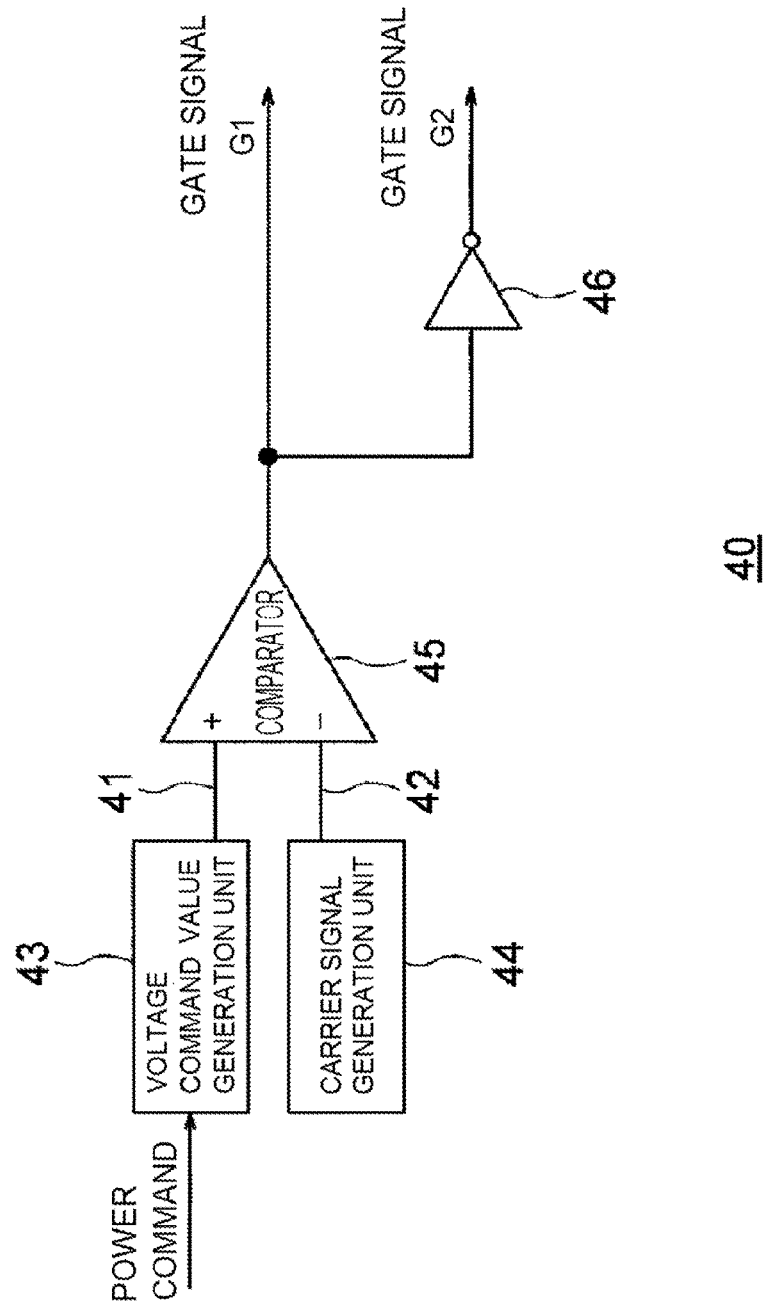
FIG. 4 is a configuration diagram for illustrating a configuration of a cell control unit in the power conversion device according to the first embodiment of the present invention.

The gate signal G1 to be supplied to the upper arm 13u is generated by pulse width modulation (PWM) in the cell control unit 40. A method of generating the gate signal G1 in the cell control unit 40 is described below. In FIG. 4, a configuration of the cell control unit 40 is illustrated. The cell control unit 40 includes a voltage command value generation unit 43, a carrier signal generation unit 44, a comparator 45, and a NOT circuit 46. To the voltage command value generation unit 43, a power command for obtaining desired power is input from a controller 50. The voltage command value generation unit 43 generates the voltage command value signal 41 on the basis of the power command, and inputs the generated voltage command value signal 41 to the comparator 45. To the comparator 45, the carrier signal 42 generated by the carrier signal generation unit 44 is also input. The carrier signal 42 is such a triangular signal as shown in FIG. 3. In the comparator 45, the voltage command value signal 41 and the carrier signal 42 are compared to each other. At this time, as shown in FIG. 3, when the voltage command value signal 41 is larger than the carrier signal 42, an ON command is output as the gate signal G1, and when the voltage command value signal 41 is smaller than the carrier signal, an OFF command is output as the gate signal G1. In this manner, the gate signal G1 is generated. On the basis of the ON command and the OFF command of the gate signal G1, the semiconductor switching element 11u is operated to be turned ON/OFF.

Meanwhile, the gate signal G2 to be supplied to the lower arm 13b is generated by logically inverting, in the NOT circuit 46, the gate signal G1 to be supplied to the upper arm 13u. On the basis of an ON command and an OFF command of the gate signal G2, the semiconductor switching element 11b is operated to be turned ON/OFF.

Through generation of the gate signal G2 to be supplied to the lower arm 13b as described above, the semiconductor switching element 11b is turned ON when the lower arm 13b is brought into conduction. Therefore, in a case where a polarity of an electric current flowing through the lower arm 13b is a polarity conducted by the diode 12b, when the diode 12b is set to the conductive state, the semiconductor switching element 11b can also be set to a conductive state synchronously.

The above-mentioned synchronous operation of the semiconductor switching element 11b can be put as follows: with the output terminals 15 and 16 being connected to the lower arm 13b, in a case where the output of the converter cell 1 is off, when the diode 12b is set to the conductive state, the semiconductor switching element 11b is also set to the conductive state synchronously.

In the first embodiment, as shown in FIG. 3, the example in which the triangular signal is used as the carrier signal 42 has been described, but a saw-tooth signal or other signals may be used as the carrier signal 42.

Moreover, in the first embodiment, the example in which the gate signal G1 to be supplied to the upper arm 13u is generated by the PWM has been described, but pulse density modulation (PDM) or other modulation methods may be used instead.

Further, in the first embodiment, the description has been given of the example in which the gate signals G1 and G2 to be supplied to the upper arm 13u and the lower arm 13b, respectively, do not include dead time. However, through use of an existing method of generating the dead time, operation may be performed with the dead time being added to the gate signals G1 and G2. The dead time is a period in which both of the upper arm 13u and the lower arm 13b are turned OFF, and is provided to prevent both of the upper arm 13u and the lower arm 13b from being turned ON and short-circuiting the arms.

A hardware configuration of the controller 50 includes a receiver as an input unit and a display device as an output unit. Moreover, a function of a power command generation unit of generating the power command of the controller 50 is implemented by a processing circuit. In other words, the controller 50 includes the processing circuit configured to generate the power command. The processing circuit may be dedicated hardware, or a central processing unit (CPU; also referred to as a processing unit, an arithmetic unit, a microprocessor, a microcomputer, a processor, or a DSP) configured to execute a program stored in a memory.

When the processing circuit is a dedicated hardware, the processing circuit corresponds to a single circuit, a complex circuit, a programmed processor, a parallel-programmed processor, an ASIC, an FPGA, or a combination thereof, for example.

When the processing circuit is a CPU, the function of the power command generation unit is implemented by software, firmware, or a combination of software and firmware. The software and the firmware are written as programs, and are stored in the memory. The processing circuit implements the function of the power command generation unit by reading and executing the programs stored in the memory. In other words, the controller 50 includes the memory configured to store the programs that are executed by the processing circuit to execute steps of generating the power command as a result. Moreover, it can also be said that those programs are intended to cause a computer to execute a procedure or method of the power command generation unit. In this case, the memory corresponds to a RAM, a ROM, a flash memory, an EPROM, an EEPROM, or other non-volatile or volatile semiconductor memories, a magnetic disk, a flexible disk, an optical disc, a compact disc, a minidisc, or a DVD, for example.

The function of the power command generation unit may be partially implemented by dedicated hardware, and partially implemented by software or firmware.

As described above, the processing circuit may implement the above-mentioned function of the controller 50 by hardware, software, firmware, or a combination thereof.

Figure 5:
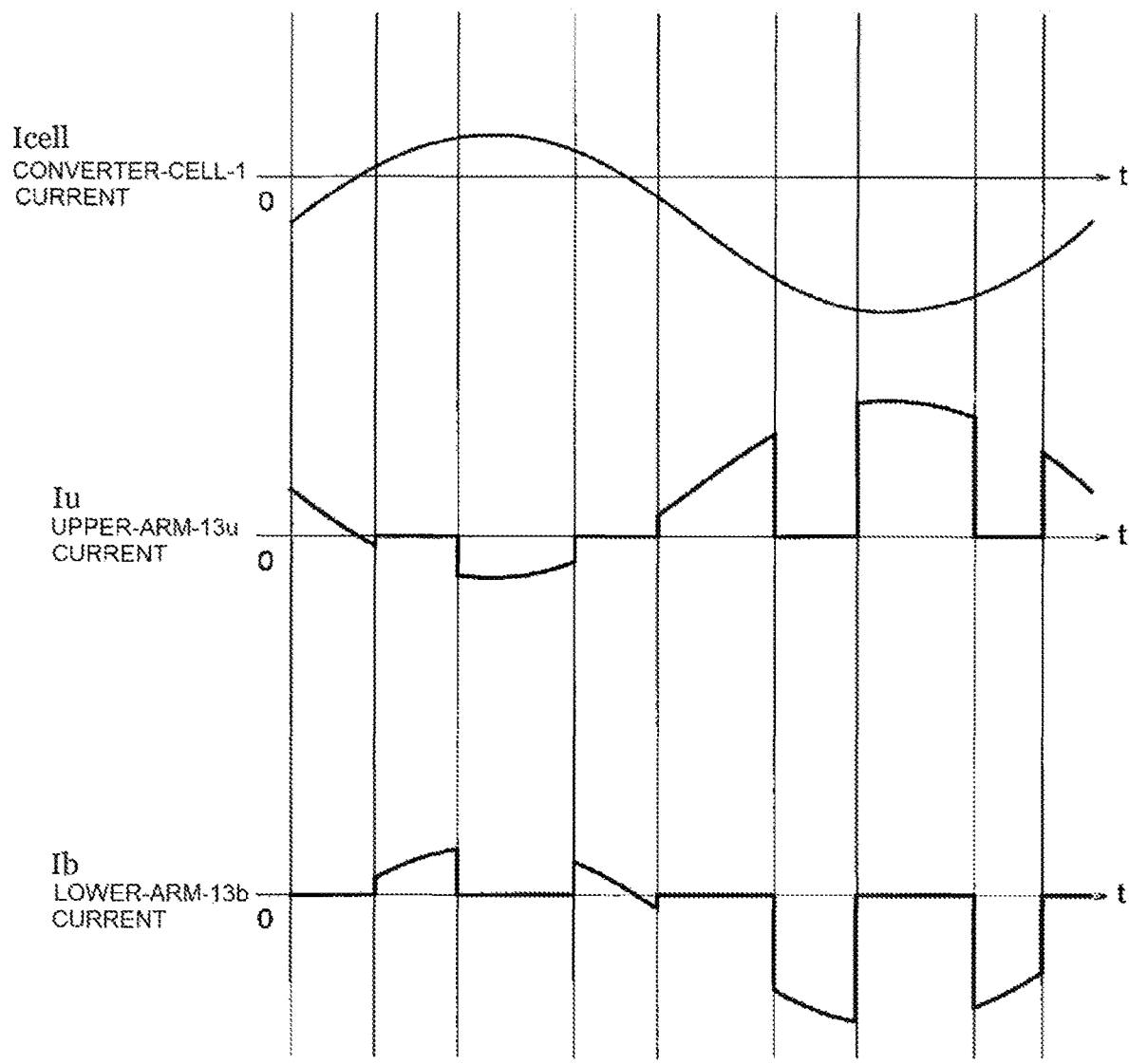
FIG. 5 is a chart for showing current waveforms of the converter cell in the power conversion device according to the first embodiment of the present invention.

In FIG. 5, there are shown a converter-cell-1 current Icell flowing through the converter cell 1, an upper-arm-13u current Iu flowing through the upper arm 13u, and a lower-arm-13b current Ib flowing through the lower arm 13b in a case where the power conversion device according to the first embodiment operates in the steady state. Directions of the currents are indicated in FIG. 2.

The power conversion device according to the first embodiment in the steady state performs the rectifier operation of transmitting electric power from the three-phase power system to the DC power system, and hence the converter-cell-1 current Icell has a waveform obtained by superimposing a negative DC component on an AC component. Therefore, DC components are superimposed also on the upper-arm-$13u$ current Iu and the lower-arm-$13b$ current Ib, and electric currents flowing through the semiconductor switching elements $11u$ and $11b$ and electric currents flowing through the diodes $12u$ and $12b$ are biased.

In the example of FIG. 5, an absolute value of a value of the converter-cell-1 current Icell has a maximum value in a case where the polarity is negative, which is larger than a maximum value in a case where the polarity is positive.

Moreover, in a case where polarities of the upper-arm-$13u$ current Iu and the lower-arm-$13b$ current Ib are positive, electric currents are allowed to flow through the semiconductor switching elements $11u$ and $11b$, and in contrast, in a case where the polarities of the upper-arm-$13u$ current Iu and the lower-arm-$13b$ current Ib are negative, electric currents are allowed to flow through the diodes $12u$ and $12b$.

In other words, in a case where the semiconductor switching element includes an IGBT configured to allow conduction in only one direction, for example, the semiconductor switching element is in a non-conductive state when an electric current is flowing through the diode.

In a general power conversion device in the related art, both of a semiconductor switching element in an upper arm and a semiconductor switching element in a lower arm include semiconductor switching elements configured to allow conduction in only one direction. Therefore, in the case where the polarities of the upper-arm current and the lower-arm current are negative, the electric current flows only through the diodes. Moreover, as described above, in a power conversion device in which an operation during steady operation is the rectifier operation, it is known that a large electric current steadily flows through the diode on the lower arm side. As a result, a large conduction loss is caused in the diode on the lower arm side.

To address this problem, in the power conversion device according to the first embodiment, the semiconductor switching element $11b$ in the lower arm $13b$ includes the semiconductor switching element configured to allow reverse conduction such that the semiconductor switching element $11b$ and the diode $12b$ are simultaneously set to the conductive states in the case where the lower-arm-$13b$ current Ib is negative, and hence the lower-arm-$13b$ current Ib is split to flow through the semiconductor switching element $11b$ and the diode $12b$. Therefore, a large electric current does not flow through the diode $12b$, with the result that the conduction loss caused in the diode $12b$ is significantly reduced to allow downsizing of a radiator disposed in the converter cell 1.

Moreover, in the upper arm $13u$, contrary to the lower arm $13b$, a large electric current steadily flows through the semiconductor switching element flu. Therefore, it is desired that, in the upper arm $13u$, an element in which a small conduction loss is caused when a large electric current flows therethrough be used as the semiconductor switching element $11u$. Therefore, in the upper arm $13u$, a semiconductor switching element configured to allow conduction in only one direction, in which an ON voltage has a saturation characteristic, is used as the semiconductor switching element $11u$. As a result, the conduction loss caused in the upper arm $13u$ can be reduced, and a capacity required of the radiator can be reduced.

In the above description, the description has been given of the example in which the power conversion device according to the first embodiment is applied to the rectifier end through which electric current is transmitted from the three-phase power system to the DC power system. However, it may also be considered that the power conversion device is applied to the inverter end through which electric power is transmitted from the DC power system to the AC power system. In that case, contrary to the first embodiment described above, a large electric current flows through the semiconductor switching element $11b$ in the lower arm $13b$, and an electric current flowing through the diode $12b$ becomes smaller, with the result that the loss reduction effect by the simultaneous conduction of the semiconductor switching element $11b$ and the diode $12b$ is limited. Meanwhile, in general, in a semiconductor switching element having a high breakdown voltage and a large electric current, which is applied to a power conversion device for a power system, when an element configured to allow reverse conduction is applied, cost is increased in some cases.

Therefore, in the first embodiment, the power conversion device according to the first embodiment is applied to the rectifier end, and the semiconductor switching element configured to allow reverse conduction is used in the lower arm $13b$ of the power conversion device to perform the simultaneous conductive operation of the semiconductor switching element $11b$ and the diode $12b$ in the lower arm $13b$, with the result that the incurred loss can be effectively suppressed while suppressing an increase in cost caused by the application of the reverse-conducting switching element in the entire direct-current power transmission system including the rectifier end and the inverter end.

As described above, according to the first embodiment, the power conversion device, which is configured to interconnect the AC system and the DC system to transmit electric power from the AC system to the DC system, includes the AC terminals U, V, and W connected to the AC system, the DC terminals P and N connected to the DC system, and the plurality of converter cells 1 connected between the AC terminals U, V, and W and the DC terminals P and N.

At least one of the converter cells 1 includes the upper arm $13u$, which includes the semiconductor switching element $11u$ and the diode $12u$ connected in anti-parallel to the semiconductor switching element $11u$, and the lower arm $13b$, which is connected in series to the upper arm $13u$, and includes the semiconductor switching element $11b$ and the diode $12b$ connected in anti-parallel to the semiconductor switching element $11b$.

Moreover, the semiconductor switching element $11u$ includes the semiconductor switching element configured to allow conduction in only one direction, and the semiconductor switching element $11b$ includes the semiconductor switching element configured to allow reverse conduction. In that configuration, the semiconductor switching element $11b$ and the diode $12b$ are simultaneously set to the conductive states.

With this configuration, in the lower arm $13b$ on the side in which the electric current flowing through the diode is large, the electric current to flow through the diode $12b$ can be split to the semiconductor switching element $11b$, and hence the loss caused in the diode $12b$ is reduced. As a result, the radiator can be downsized.

Moreover, in the first embodiment, the cell control unit 40 configured to generate the first gate signal G1, which is input to the upper arm $13u$, and the second gate signal G2, which is input to the lower arm $13b$, is further included, and the cell control unit 40 generates the second gate signal G2, which is input to the lower arm $13b$, by logically inverting the first gate signal G1, which is input to the upper arm 13u. As a result, synchronous rectification can be achieved with the use of the existing method of generating the gate signals by using the PWM, the PDM, or other modulation methods.

Further, in the first embodiment, the description has been given of the example in which the converter cell 1 includes the chopper circuit, but the present invention is not limited to that case. For example, the converter cell 1 may include a full-bridge circuit. In this manner, in the first embodiment, the loss caused in the diode can be reduced with the use of the existing chopper circuit configuration or full-bridge circuit configuration as the configuration of the converter cell. The example in which the converter cell 1 includes the full-bridge circuit is described below in a second embodiment of the present invention.

Second Embodiment

In the second embodiment, a description is given of an example of a power conversion device applied to a rectifier end, which is configured to interconnect a three-phase power system and a DC power system to transmit electric power from the three-phase power system to the DC power system as in the first embodiment, and in which the converter cell has a circuit configuration that is different from that in the first embodiment.

In the description of the second embodiment, only differences from the first embodiment are described, and a description on the same or similar parts is omitted.

Figure 6:
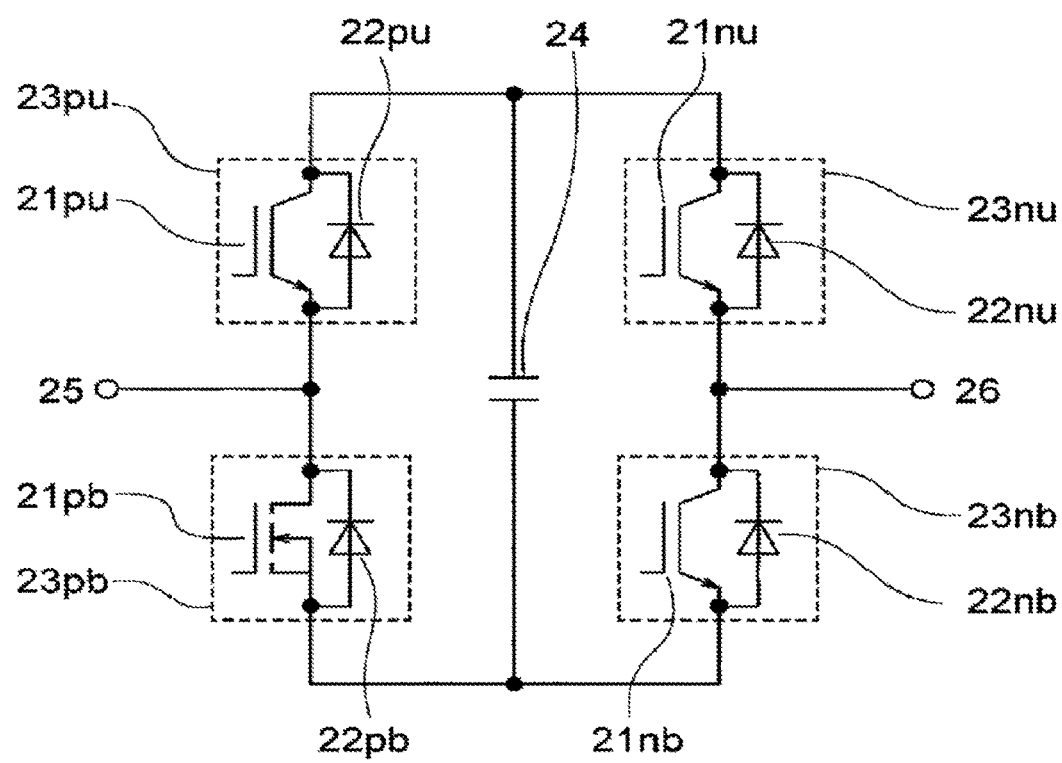
FIG. 6 is a circuit diagram for illustrating a configuration of a converter cell in a power conversion device according to a second embodiment of the present invention.

FIG. 6 is a diagram for illustrating a configuration of a converter cell 1A in the power conversion device according to the second embodiment. As illustrated in FIG. 6, in the second embodiment, the circuit configuration of the converter cell 1A is a full-bridge circuit configuration. When the converter cell 1A having such a full-bridge circuit configuration is used, an advantage that a DC fault current can be suppressed and other advantages are obtained.

As illustrated in FIG. 6, the converter cell 1A includes a positive upper arm 23pu, a positive lower arm 23pb, a negative upper arm 23nu, a negative lower arm 23nb, an energy storage device 24, an output terminal 25, and an output terminal 26.

The positive upper arm 23pu includes a semiconductor switching element 21pu configured to allow conduction in only one direction and a diode 22pu connected in anti-parallel to the semiconductor switching element 21pu.

The positive lower arm 23pb includes a semiconductor switching element 21pb configured to allow reverse conduction and a diode 22pb connected in anti-parallel to the semiconductor switching element 21pb.

The negative upper arm 23nu includes a semiconductor switching element 21nu configured to allow conduction in only one direction and a diode 22nu connected in anti-parallel to the semiconductor switching element 21nu.

The negative upper arm 23nb includes a semiconductor switching element 21nb configured to allow conduction in only one direction and a diode 22nb connected in anti-parallel to the semiconductor switching element 21nb.

The positive upper arm 23pu and the positive lower arm 23pb are connected in series to each other to form a positive leg, and the negative upper arm 23nu and the negative lower arm 23nb are connected in series to each other to form a negative leg. In this manner, the converter cell 1A includes at least one positive leg and at least one negative leg.

The positive leg, the negative leg, and the energy storage device 24 are connected in parallel to one another.

The output terminal 25 is connected to a midpoint between the positive upper arm 23pu and the positive lower arm 23pb, and the output terminal 26 is connected to a midpoint between the negative upper arm 23nu and the negative lower arm 23nb.

In the second embodiment, as the semiconductor switching element 21pb, a MOSFET, a reverse-conducting IGBT, a reverse-conducting thyristor, or other semiconductor elements configured to allow reverse conduction is used.

Further, in the second embodiment, as the semiconductor switching elements 21pu, 21nu, and 21nb, an IGBT, a GCT, or other semiconductor elements is used.

Further, in the second embodiment, when each of the semiconductor switching elements 21pu, 21pb, 21nu, and 21nb includes a diode that is connected in anti-parallel, the diodes 22pu, 22pb, 22nu, and 22nb may be omitted.

Still further, in the second embodiment, the description has been given of the example in which the semiconductor switching elements 21pu, 21pb, 21nu, and 21nb and the diodes 22pu, 22pb, 22nu, and 22nb are used in a one-series one-parallel configuration, but for the purpose of increasing a capacity of the power conversion device, semiconductor switching elements and diodes may be used in a multiple-series multiple-parallel configuration in each arm.

Subsequently, switching operation of the converter cell 1A is described.

In the second embodiment, when the power conversion device performs steady operation, the semiconductor switching element 21nu is always in a non-conductive state, and the semiconductor switching element 21nb is always in a conductive state. Further, the semiconductor switching elements 21pu and 21pb switch a conductive or non-conductive state of the semiconductor switching elements by PWM modulation similar to that in the first embodiment. Through the above-mentioned switching operation, the power conversion device according to the second embodiment performs the same circuit operation as that in the first embodiment. Therefore, in the positive lower arm 23pb, the semiconductor switching element 21pb and the diode 22pb are simultaneously set to conductive states.

As a result, in the power conversion device according to the second embodiment, as in the first embodiment, the large electric current steadily flowing through the diode 22pb in the positive lower arm 23pb can be split to the semiconductor switching element 21pb and the diode 22pb, to thereby significantly reduce the conduction loss caused in the diode 22pb, and allow downsizing of the radiator.

With the above-mentioned configuration, also in the power conversion device according to the second embodiment, the converter cell 1A operates similarly as the converter cell 1 according to the first embodiment described above, and hence similar effects can be obtained. Further, in the second embodiment, the converter cell 1A has the full-bridge circuit configuration as illustrated in FIG. 6, and hence it is possible to obtain the effect that the DC fault current can be suppressed.

Third Embodiment

In a third embodiment of the present invention, a direct-current power transmission system including the power conversion device described in the first embodiment or the second embodiment is described. In the third embodiment, a description is given of an example of a two-terminal direct-current power transmission system including a power conversion device at a rectifier end configured to interconnect an AC system and a DC system to transmit electric power from the AC system to the DC system, and a power conversion device at an inverter end configured to interconnect an AC system and a DC system to transmit electric power from the DC system to the AC system.

In the description of the third embodiment, only differences from the first and second embodiments are described, and a description on the same or similar parts is omitted.

Figure 7:
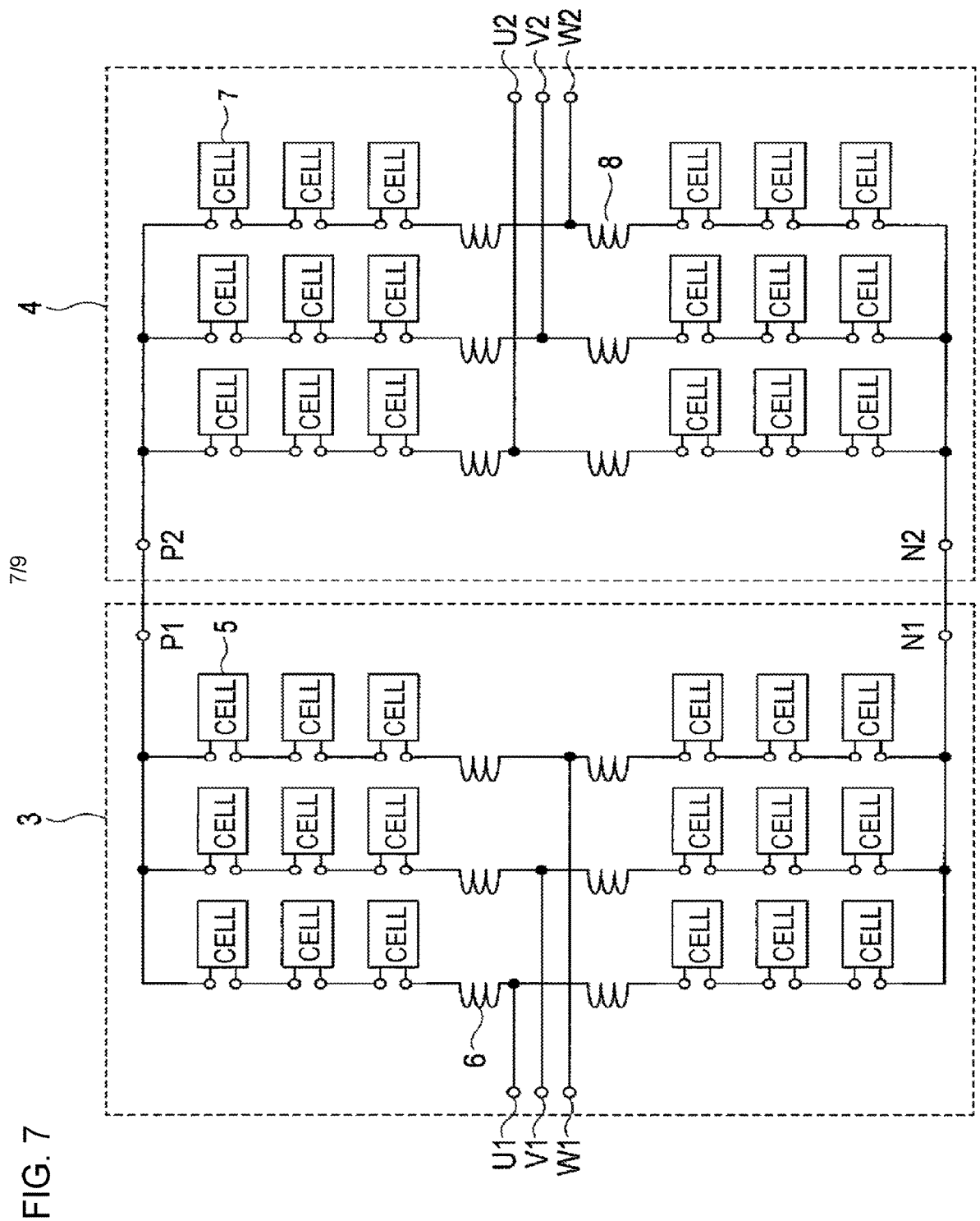
FIG. 7 is a configuration diagram for illustrating configurations of power conversion devices and a direct-current power transmission system according to a third embodiment of the present invention.

FIG. 7 is a configuration diagram for illustrating a configuration of the power conversion devices and the direct-current power transmission system according to the third embodiment of the present invention.

As illustrated in FIG. 7, the direct-current power transmission system according to the third embodiment includes a power conversion device 3 configured to interconnect an AC system and a DC system to transmit electric power from the AC system to the DC system, and a power conversion device 4 configured to interconnect an AC system and a DC system to transmit electric power from the DC system to the AC system, and the power conversion device 3 and the power conversion device 4 are connected to each other on the DC system side.

The power conversion device 3 has the same configuration as that of the power conversion device illustrated in FIG. 1. Specifically, the power conversion device described in the first or second embodiment is applied to the power conversion device 3. To briefly describe the configuration of the power conversion device 3, the power conversion device 3 includes three AC terminals U1, V1, and W1 and two DC terminals P1 and N1, and includes a plurality of phase arms, each of which is formed by connecting a plurality of converter cells 5 in series to one another, between the AC terminals U1, V1, and W1 and the DC terminals P1 and N1. A configuration of the phase arm formed of the converter cells 5 is the same as the configuration of the phase arm formed of the converter cells 1 illustrated in FIG. 1, and hence a description thereof is omitted here.

Moreover, a reactor 6 is connected between each of the AC terminals U1, V1, and W1 and each of the DC terminals P1 and N1. A configuration of the reactor 6 is also the same as the configuration of the reactor 2 illustrated in FIG. 1, and hence a description thereof is omitted here.

A circuit configuration of the converter cell 5 of the power conversion device 3 is the same as the circuit configuration of the converter cell 1 illustrated in FIG. 2 in the first embodiment, or the same as the circuit configuration of the converter cell 1A illustrated in FIG. 6 in the second embodiment, and hence a description thereof is omitted.

Meanwhile, the power conversion device 4 includes three AC terminals U2, V2, and W2 and two DC terminals P2 and N2, and includes phase arms, each of which is formed by connecting a plurality of converter cells 7 in series to one another, between the AC terminals U2, V2, and W2 and the DC terminals P2, N2.

Moreover, a reactor 8 is connected between each of the AC terminals U2, V2, and W2 and each of the DC terminals P2 and N2. In the third embodiment, a description is given of an example in which the reactor 8 is connected between each of the AC terminals U2, V2, and W2 and each phase arm, but the present invention is not limited thereto. For example, the reactor 8 may be connected between each of the DC terminals P2 and N2 and each phase arm. Moreover, there may be adopted a configuration in which the reactor 8 is disposed only between each of the AC terminals U2, V2, and W2 and the DC terminal P2, and similarly, there may be adopted a configuration in which the reactor 8 is disposed only between each of the AC terminals U2, V2, and W2 and the DC terminal N2. Further, it is not necessarily required that the reactor 8 have a coil shape, and the reactor 8 may be formed of a cable having an intentionally long wiring length, for example.

Each phase arm of the power conversion device 4 is formed by connecting a plurality of converter cells 7 in series to one another. In the third embodiment, each phase arm is formed by connecting three converter cells 7 in series to one another, but the present invention is not limited thereto. The number of converter cells 7 included in each phase arm may be any number, and may be suitably determined.

In FIG. 7, six phase arms are disposed in the power conversion device 4. Specifically, one phase arm is connected between the DC terminal P2 and each of the AC terminals U2, V2, and W2, and similarly, one phase arm is connected between the DC terminal N2 and each of the AC terminals U2, V2, and W2.

The power conversion devices 3 and 4 according to the third embodiment are interconnected to the three-phase power system, and hence an example in which the AC terminals of the power conversion device 3 include three terminals U1, V1, and W1, and the AC terminals of the power conversion device 4 include three terminals U2, V2, and W2 is illustrated. However, there may be equally adopted a configuration in which the AC terminals include two terminals when the power conversion devices are interconnected to a single-phase power system, or a configuration in which the AC terminals include four or more terminals when the power conversion devices are interconnected to a multi-phase power system.

Figure 8:
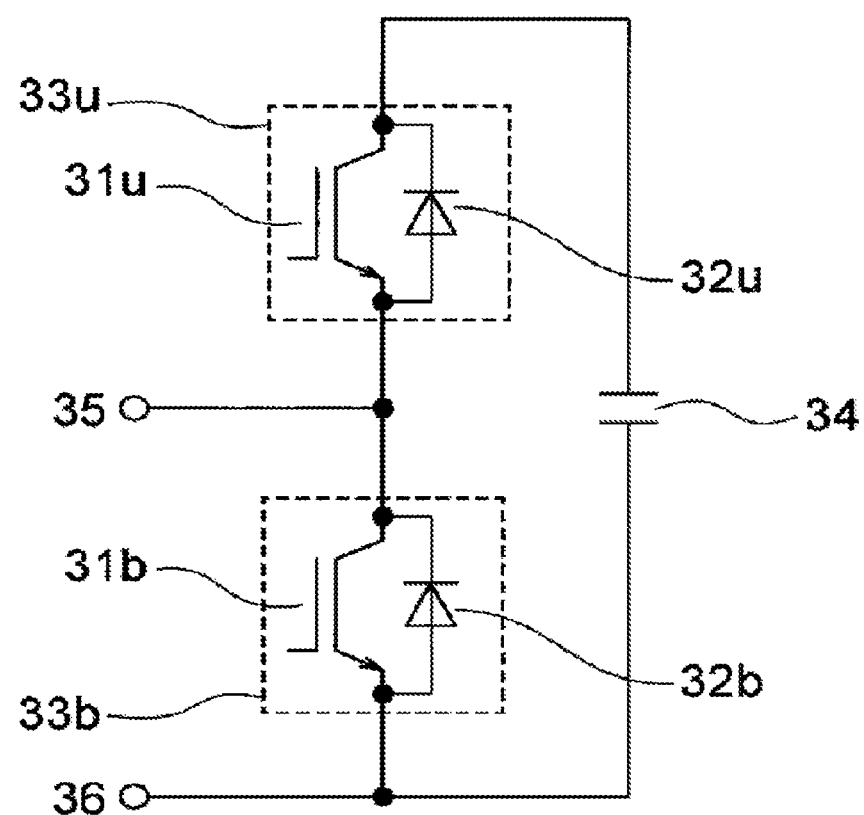
FIG. 8 is a circuit diagram for illustrating a configuration of a converter cell in the power conversion device at an inverter end according to the third embodiment of the present invention.

A circuit configuration of the converter cell 7 is illustrated in FIG. 8.

As illustrated in FIG. 8, the converter cell 7 has a chopper circuit configuration. The converter cell 7 includes an upper arm 33$u$, a lower arm 33$b$, an energy storage device 34, an output terminal 35, and an output terminal 36.

The upper arm 33$u$ includes a semiconductor switching element 31$u$ configured to allow conduction in only one direction and a diode 32$u$ connected in anti-parallel to the semiconductor switching element 31$u$.

The lower arm 33$b$ includes a semiconductor switching element 31$b$ configured to allow conduction in only one direction and a diode 32$b$ connected in anti-parallel to the semiconductor switching element 31$b$.

As each of the semiconductor switching element 31$u$ and the semiconductor switching element 31$b$, an IGBT, a GCT, or other semiconductor elements is used.

The upper arm 33$u$ and the lower arm 33$b$ are connected in series to each other to form a leg. The energy storage device 34 is connected in parallel to the leg. In this manner, the converter cell 7 includes at least one leg.

The energy storage device 34 includes a capacitor, for example. As the capacitor, an electrolytic capacitor, a film capacitor, or the like may be used, and a capacitor of another type may be used.

To a node at which one end of the upper arm 33$u$ and one end of the lower arm 33$b$ are connected in series to each other, the output terminal 35 is connected. The node is hereinafter referred to as a midpoint between the upper arm 33$u$ and the lower arm 33$b$. Moreover, the other end of the upper arm 33$u$ is connected to the energy storage device 34 described above. Further, the other end of the lower arm 33$b$ is connected to the energy storage device 34, and to the output terminal 36.

In the third embodiment, the output terminals 35 and 36 are connected to both ends of the lower arm 33$b$, but the present invention is not limited to that case. For example, the output terminals 35 and 36 may be connected to both ends of the upper arm 33u to form a chopper circuit.

As a method of generating gate signals of the converter cell 5 of the power conversion device 3, the method shown in FIG. 3 and illustrated in FIG. 4 in the first embodiment is applied. Specifically, in the converter cell 5, the gate signals G1 and G2 shown in FIG. 3 are input to the upper arm 13u and the lower arm 13b, respectively.

Therefore, in the power conversion device 3, as in the power conversion device described in the first embodiment, a rectifier end operation is performed in a steady state, and hence a large electric current flows through the diode 12b. However, with the semiconductor switching element 11b and the diode 12b being simultaneously set to the conductive states, the lower-arm current is split to flow through the semiconductor switching element 11b and the diode 12b. Therefore, the conduction loss caused in the diode 12b is significantly reduced to allow downsizing of the radiator.

As a method of generating gate signals of the converter cell 7, as with the converter cell 5, the method shown in FIG. 3 and illustrated in FIG. 4 in the first embodiment is applied. Specifically, in the converter cell 7, the gate signals G1 and G2 shown in FIG. 3 are input to the upper arm 33u and the lower arm 33b, respectively.

It should be noted, however, that in this case, in the converter cell 7, both of the upper arm 33u and the lower arm 33b use the semiconductor switching elements 31u and 31b configured to allow conduction in only one direction, and hence the simultaneous conduction of the semiconductor switching elements and the diode as in the converter cell 5 does not occur.

With the power conversion device 4 performing an inverter-end operation, as described in the first embodiment, a large electric current flows through the semiconductor switching element 31b in the lower arm 33b, and an electric current to flow through the diode 32b is small, with the result that the effect of reducing the loss by the simultaneous conduction of the semiconductor switching element 31b and the diode 32b is limited. Therefore, as the semiconductor switching element 31b in the lower arm 33b of the power conversion device 4, a semiconductor switching element configured to allow reverse conduction, which is high cost, is not used, but a semiconductor switching element configured to allow conduction in only one direction is used.

In this manner, in the third embodiment, the semiconductor switching element 11b configured to allow reverse conduction is applied only to the power conversion device 3 at the rectifier end, and a simultaneous conduction operation is performed on the semiconductor switching element 11b and the diode 12b in the lower arm 13b to provide an advantage of effectively suppressing the incurred loss while suppressing the increase in cost caused by the application of the reverse-conducting elements over the entire direct-current power transmission system including the rectifier end and the inverter end.

As described above, in the third embodiment, in the direct-current power transmission system, the loss in the diode generated at the rectifier end in which electric power is transmitted from the AC system to the DC system can be reduced. Therefore, effects similar to those of the first and second embodiments can be obtained to allow downsizing of the radiator.

In the third embodiment, the example in which the converter cell 5 includes the chopper circuit has been described. However, the present invention is not limited to that case, and the converter cell 1A described in the second embodiment may be applied to the converter cell 5 to form the converter cell 5 of a full-bridge circuit. In that case, it is needless to say that effects similar to those of the second embodiment can be obtained. Moreover, similarly, the converter cell 7 may include a full-bridge circuit. It should be noted, however, that in that case, all the semiconductor switching elements forming the full-bridge circuit include semiconductor switching elements configured to allow conduction in only one direction to suppress the increase in cost caused by the application of the reverse-conducting elements.

Fourth Embodiment

In the first to third embodiments described above, the power conversion devices applied to the power system and the direct-current power transmission system have been described. The power conversion devices according to the present invention are also applicable to applications other than the power system and the direct-current power transmission system. In a fourth embodiment of the present invention, as an example of the applications, a power conversion device applied to a motor drive system is described.

In the description of the fourth embodiment, only differences from the first and second embodiments are described, and a description on the same or similar parts is omitted.

Figure 9:
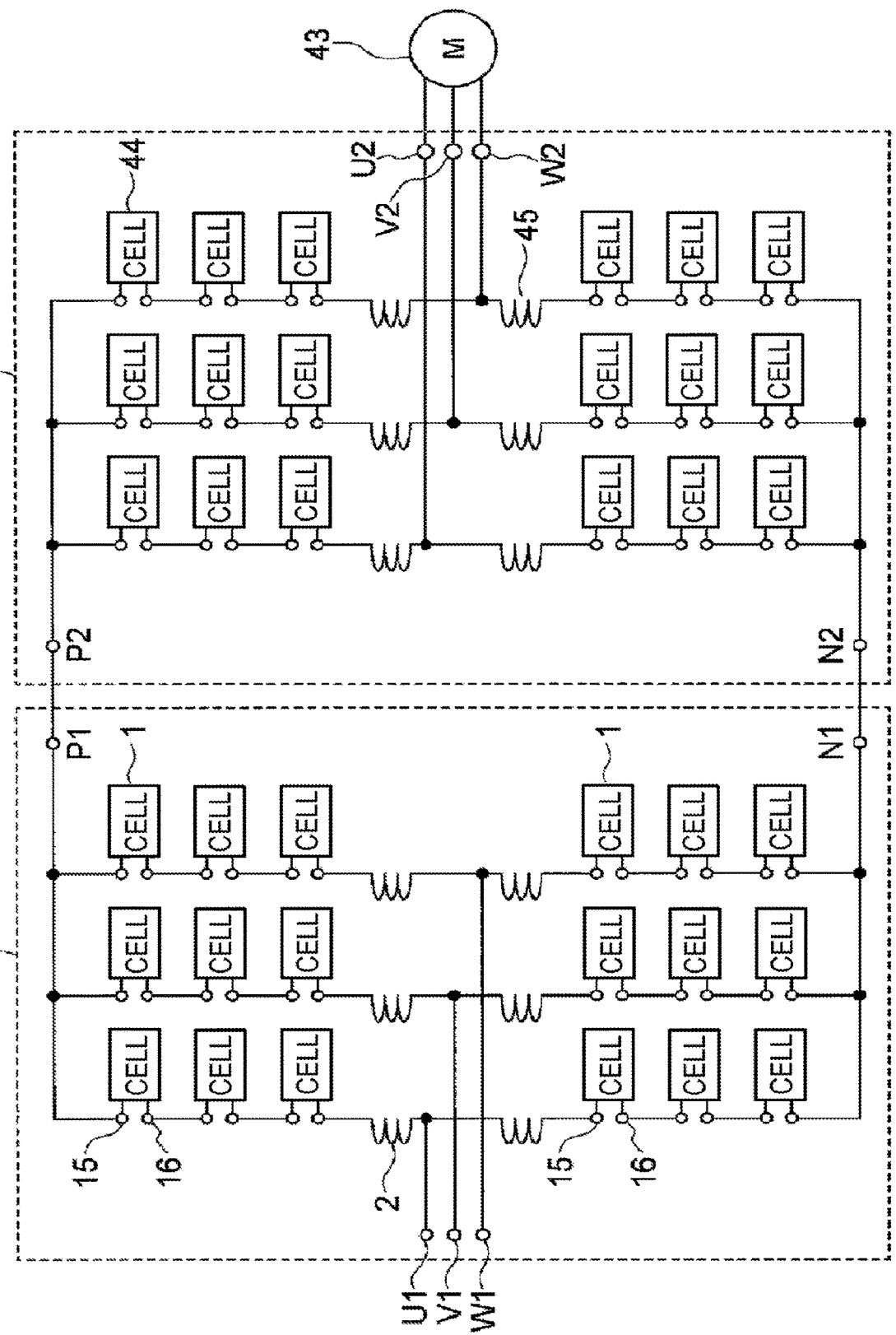
FIG. 9 is a configuration diagram for illustrating configurations of power conversion devices and a motor drive system according to a fourth embodiment of the present invention.

FIG. 9 is a configuration diagram for illustrating configurations of the power conversion device and the motor drive system according to the fourth embodiment.

As illustrated in FIG. 9, the motor drive system according to the fourth embodiment includes a power conversion device 41 and an inverter 42.

A configuration of the power conversion device 41 according to the fourth embodiment is similar to the configuration of the power conversion device illustrated in FIG. 1. In the first embodiment or the second embodiment, the DC terminals P and N are connected to the DC power system, but in the fourth embodiment, DC terminals P1 and N1 are connected to the inverter 42 configured to drive a motor 43. Meanwhile, AC terminals U1, V1, and W1 of the power conversion device 41 are connected to an AC system as in FIG. 1.

The inverter 42 includes three AC terminals U2, V2, and W2 and two DC terminals P2 and N2. The DC terminals P2 and N2 of the inverter 42 are connected to the DC terminals P1 and N1 of the power conversion device 41, respectively. Moreover, the AC terminals U2, V2, and W2 of the inverter 42 are connected to a three-phase motor 43.

In the inverter 42, six phase arms are disposed between the AC terminals U2, V2, and W2 and the DC terminals P2 and N2. Specifically, one phase arm is connected between the DC terminal P2 and each of the AC terminals U2, V2, and W2, and similarly, one phase arm is connected between the DC terminal N2 and each of the AC terminals U2, V2, and W2. Each phase arm is formed by connecting a plurality of converter cells 44 in series to one another. In the fourth embodiment, each phase arm is formed by connecting three converter cells 44 in series to one another, but the present invention is not limited thereto. The number of converter cells 44 included in each phase arm may be any number, and may be suitably determined. Moreover, the configuration of the converter cell 44 may be a configuration similar to those of the converter cell 1 illustrated in FIG. 2, the converter cell 1A illustrated in FIG. 6, or the converter cell 7 illustrated in FIG. 8, for example.

Moreover, a reactor 45 is connected between each of the AC terminals U2, V2, and W2 and each of the DC terminals P2 and N2. In the fourth embodiment, a description is given of an example in which the reactor 45 is connected between each of the AC terminals U2, V2, and W2 and each phase arm, but the present invention is not limited thereto. For example, the reactor 45 may be connected between each of the DC terminals P2 and N2 and each phase arm. Moreover, there may be adopted a configuration in which the reactor 45 is disposed only between each of the AC terminals U2, V2, and W2 and the DC terminal P2, and similarly, there may be adopted a configuration in which the reactor 45 is disposed only between each of the AC terminals U2, V2, and W2 and the DC terminal N2. Further, it is not always required that the reactor 45 have a coil shape, and the reactor 45 may be formed of a cable having an intentionally long wiring length, for example.

The power conversion device 41 and the inverter 42 according to the fourth embodiment are connected to a three-phase AC system and the three-phase motor 43, respectively, and hence a description is given of an example in which the AC terminals of the power conversion device 41 include three terminals U1, V1, and W1, and the AC terminals of the inverter 42 include three terminals U2, V2, and W2. However, when the power conversion device 41 and the inverter 42 are connected to a single-phase power system and a single-phase motor, respectively, there may equally be adopted a configuration in which the AC terminals include two terminals, and when the power conversion device 41 and the inverter 42 are connected to a multi-phase power system and a multi-phase motor, respectively, there may equally be adopted a configuration in which the AC terminals include four or more terminals.

Operation of the power conversion device 41 is similar to the operation of the power conversion device described in the first embodiment or the second embodiment. Therefore, in the power conversion device 41, an electric current to flow through the diode in the arm on the side in which the large electric current flows may be split to the semiconductor switching element connected in parallel to the diode. Therefore, a loss caused in the diode is reduced to allow downsizing of the radiator.

In the fourth embodiment, as a circuit configuration of the inverter 42, the inverter having an MMC configuration has been described as with the power conversion device 41, but the present invention is not limited thereto. For example, a two-level inverter, an NPC inverter, or other inverters having an existing configuration is also applicable. Moreover, in the fourth embodiment, the description has been given of the example in which the three-phase motor is used as the motor 43, but a single-phase motor or a four-or-more phase motor may similarly be used as the motor 43.

The invention claimed is:

1. A power conversion device, which is configured to transfer electric power between an alternating current (AC) and a direct current (DC), the power conversion device comprising:
   AC terminals to be connected to the AC side;
   DC terminals to be connected to the DC side; and
   a plurality of converter cells connected between the AC terminals and the DC terminals,
   each of the plurality of converter cells including at least one leg, which includes:
      a first arm, which includes a first semiconductor switching element and a first diode connected in anti-parallel to the first semiconductor switching element; and
      a second arm, which is connected in series to the first arm, and includes a second semiconductor switching element and a second diode connected in anti-parallel to the second semiconductor switching element,
   wherein one direction in the leg is defined as a positive direction, and a direction opposite to the one direction in the leg is defined as a negative direction,
   wherein the first diode and the second diode are configured to be conductive in the negative direction,
   wherein the first semiconductor switching element including a semiconductor switching element configured to allow conduction in the positive direction,
   wherein the second semiconductor switching element including a semiconductor switching element configured to allow conduction both in the positive direction and the negative direction,
   wherein each of the plurality of converter cells is controlled to perform a rectifier operation to transmit power from the AC side to the DC side in steady state,
   wherein the current in the positive direction flowing to the first arm in the steady state is larger than the current in the negative direction flowing to the first arm in the steady state,
   wherein the current in the negative direction flowing to the second arm in the steady state is larger than the current in the positive direction flowing to the second arm in the steady state, and
   wherein the second semiconductor switching element is also brought into a conductive state simultaneously when the second diode is in a conductive state.

2. The power conversion device according to claim 1,
   wherein the maximum value of the current in the positive direction flowing to the first arm in the steady state is larger than the maximum value of the current in the positive direction flowing to the second arm in the steady state, and
   wherein the maximum value of the current in the negative direction flowing to the second arm in the steady state is larger than the maximum value of the current in the negative direction flowing to the first arm in the steady state.

3. The power conversion device according to claim 1,
   wherein each of the plurality of the converter cells further comprises an energy storage device connected in parallel with a leg including the first arm and the second arm,
   wherein one end of the first arm is connected to the energy storage device and one end of the second arm is connected to the energy storage device,
   wherein a first connection point, where the other end of the first arm is connected to the second arm, is connected to a first output terminal,
   wherein a second connection point, where the one end of the second arm and the energy storage device is connected, is connected to a second output terminal,
   wherein the first semiconductor switching element is configured to be conductive only in the direction from the energy storage element to the first connection point, and
   wherein the second semiconductor switching element is configured to be conductive in a direction from the first connection point to the second output terminal and is configured to be conductive in a direction from the second connection point to the first connection point.

4. The power conversion device according to claim 1, wherein, in each of the plurality of converter cells, in a case where a voltage output of the each of the plurality of converter cells is off, the second semiconductor switching element enters the conductive state simultaneously when the second diode is in the conductive state.

5. The power conversion device according to claim 4, further comprising a cell control unit configured to generate a first gate signal, which is input to the first arm, and a second gate signal, which is input to the second arm,
wherein the cell control unit is configured to generate the second gate signal, which is input to the second arm, by logically inverting the first gate signal, which is input to the first arm.

6. The power conversion device according to claim 1,
wherein each of the plurality of the converter cells comprises a leg including the first arm and the second arm as a first leg, and comprises a leg including a third arm and a fourth arm as a second leg,
wherein the third arm includes a third semiconductor switching element and a third diode connected in anti-parallel to the third semiconductor switching element,
wherein the fourth arm, which is connected in series to the third arm, and includes a fourth semiconductor switching element and a fourth diode connected in anti-parallel to the fourth semiconductor switching element,
wherein each of the plurality of the converter cells further comprises an energy storage device connected in parallel with a leg including the first arm and the second arm,
wherein a connection point, where the first arm and the second arm is connected, is connected to a third output terminal, and a connection point, where the third arm and the fourth arm is connected, is connected to a fourth output terminal,
wherein the third semiconductor switching element including a semiconductor switching element configured to allow conduction in only one direction, and
wherein the fourth semiconductor switching element including a semiconductor switching element configured to allow conduction in only one direction.

7. A direct-current power transmission system, comprising:
one or more first power conversion devices, which are configured to interconnect an AC system and a DC system to transmit electric power from the AC system to the DC system; and
one or more second power conversion devices, which are configured to interconnect a DC system and an AC system to transmit electric power from the DC system to the AC system,
each of the one or more first power conversion devices including:
first AC terminals to be connected to a first AC system;
first DC terminals to be connected to a first DC system; and
a plurality of first converter cells connected between the first AC terminals and the first DC terminals,
each of the plurality of first converter cells including at least one leg, which includes:
a first arm, which includes a first semiconductor switching element and a first diode connected in anti-parallel to the first semiconductor switching element; and
a second arm, which is connected in series to the first arm, and includes a second semiconductor switching element and a second diode connected in anti-parallel to the second semiconductor switching element,
wherein one direction in the leg is defined as a positive direction, and a direction opposite to the one direction in the leg is defined as a negative direction,
wherein the first semiconductor switching element including a semiconductor switching element configured to allow conduction in the positive direction,
wherein the second semiconductor switching element including a semiconductor switching element configured to allow conduction both in the positive direction and the negative direction,
wherein the current in the positive direction flowing to the first arm in the steady state is larger than the current in the negative direction flowing to the first arm in the steady state,
wherein the current in the negative direction flowing to the second arm in the steady state is larger than the current in the positive direction flowing to the second arm in the steady state, and
wherein the second semiconductor switching element is also brought into a conductive state simultaneously when the second diode is in a conductive state.

8. The direct-current power transmission system according to claim 7,
wherein the maximum value of the current in the positive direction flowing to the first arm in the steady state is larger than the maximum value of the current in the positive direction flowing to the second arm in the steady state, and
wherein the maximum value of the current in the negative direction flowing to the second arm in the steady state is larger than the maximum value of the current in the negative direction flowing to the first arm in the steady state.

9. The direct-current power transmission system according to claim 7, wherein, in each of the plurality of first converter cells, in a case where a voltage output of the each of the plurality of first converter cells is off, the second semiconductor switching element enters the conductive state simultaneously when the second diode is in the conductive state.

10. The direct-current power transmission system according to claim 9,
wherein each of the one or more first power conversion devices further includes a cell control unit configured to generate a first gate signal, which is input to the first arm, and a second gate signal, which is input to the second arm, and
wherein the cell control unit is configured to generate the second gate signal to be input to the second arm, by logically inverting the first gate signal to be input to the first arm.

11. The direct-current power transmission system according to claim 7, wherein each of the plurality of first converter cells includes a chopper circuit or a full-bridge circuit.

12. A direct-current power transmission system, comprising:
one or more first power conversion devices, which are configured to interconnect an AC system and a DC system to transmit electric power from the AC system to the DC system; and
one or more second power conversion devices, which are configured to interconnect a DC system and an AC system to transmit electric power from the DC system to the AC system, each of the one or more first power conversion devices including:
   first AC terminals to be connected to a first AC system;
   first DC terminals to be connected to a first DC system; and
   a plurality of first converter cells connected between the first AC terminals and the first DC terminals,
each of the plurality of first converter cells including at least one leg, which includes:
   a first arm, which includes a first semiconductor switching element and a first diode connected in anti-parallel to the first semiconductor switching element; and
   a second arm, which is connected in series to the first arm, and includes a second semiconductor switching element and a second diode connected in anti-parallel to the second semiconductor switching element,
wherein the first semiconductor switching element including a semiconductor switching element configured to allow conduction in only one direction,
wherein the second semiconductor switching element including a semiconductor switching element configured to allow reverse conduction,
wherein each of the one or more second power conversion devices includes:
   second DC terminals to be connected to the first DC terminals of the one or more first power conversion devices via the first DC system;
   second AC terminals to be connected to a second AC system; and
   a plurality of second converter cells connected between the second DC terminals and the second AC terminals,
wherein each of the plurality of second converter cells includes at least one leg, which includes:
   a third arm, which includes a third semiconductor switching element and a third diode connected in anti-parallel to the third semiconductor switching element; and
   a fourth arm, which is connected in series to the third arm, and includes a fourth semiconductor switching element and a fourth diode connected in anti-parallel to the fourth semiconductor switching element, and
wherein each of the third semiconductor switching element and the fourth semiconductor switching element includes a semiconductor switching element configured to allow conduction in only one direction.

13. A motor drive system, comprising:
the power conversion device of claim 1; and
an inverter connected to the power conversion device to drive a motor.

* * * * *